Oct. 18, 1960 C. E. HUTCHINSON 2,956,507
AQUARIUM CLEANING DEVICE
Filed Dec. 4, 1953
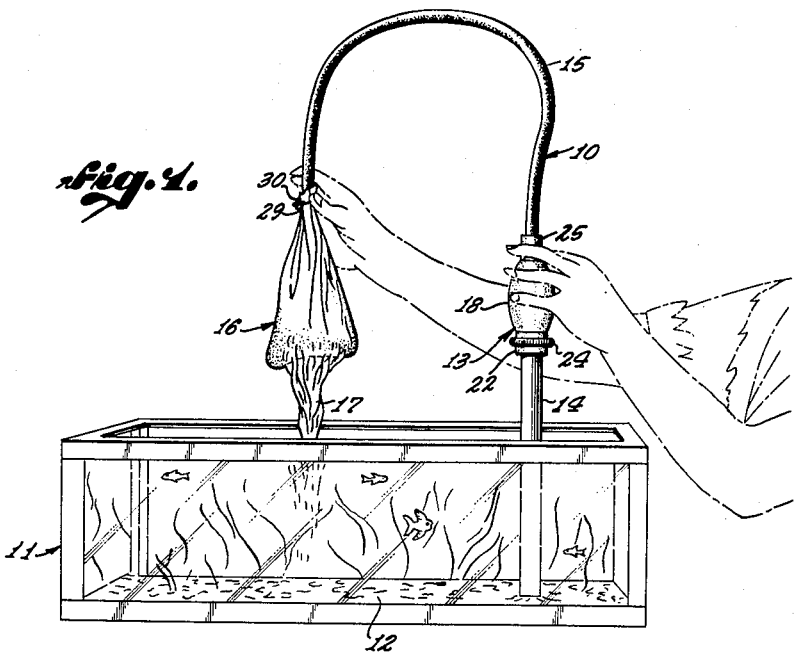
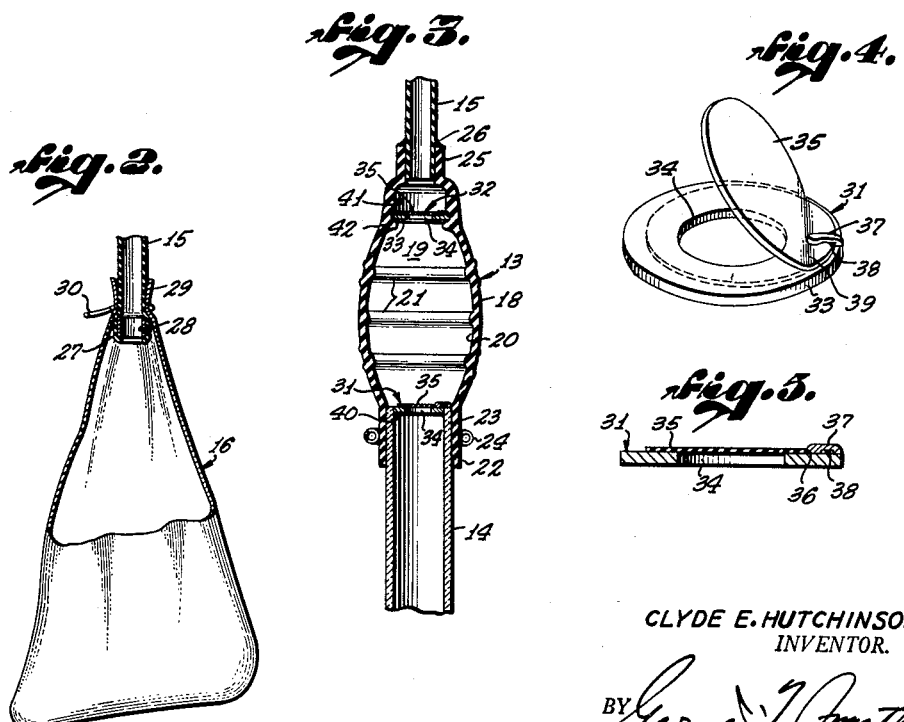
CLYDE E. HUTCHINSON,
INVENTOR.
BY *George J. Smyth*
ATTORNEY.

United States Patent Office 2,956,507
Patented Oct. 18, 1960

2,956,507

AQUARIUM CLEANING DEVICE

Clyde E. Hutchinson, 3958 Alla Road, Venice, Calif.

Filed Dec. 4, 1953, Ser. No. 396,145

3 Claims. (Cl. 103—148)

The present invention relates generally to a manually operable water cleansing and filtering device for water filled tanks, aquariums or the like and relates more specifically to a portable cleansing and filtering device for removing contaminants from water and returning the same water to said aquarium in a cleansed condition. This is a continuation-in-part of my application, Serial No. 169,056, filed June 19, 1950, now Patent No. 2,672,987.

It is desirable, in cleansing and filtering devices of the class described, to construct such devices in a manner to permit simple and reliable operation thereof by individuals maintaining aquariums or the like, and to eliminate unnecessary or complex structures that may add to manufacturing costs of such devices. It is also desirable that such devices have the ability to pick up sand and sediment that may collect in the bottom of an aquarium, tumble this material and circulate water therethrough without passing heavier sand particles through the device. In the event that sand particles should enter the operating portions of the device, it is further desirable that valve and the like be rugged and efficient in operation as to prevent malfunctioning thereof in the presence of such particles.

With reference to the drawing:

Fig. 1 is a perspective view showing the cleansing and filtering device of the present invention in use with an aquarium or the like;

Fig. 2 is an enlarged sectional view showing a filter bag and means for removably securing said bag to the device;

Fig. 3 is an enlarged sectional view of the pumping member employed with the present invention and showing the valve arrangement therefor;

Fig. 4 is an enlarged perspective view showing one of the check valves employed with the present invention; and Fig. 5 is a transverse sectional view of the check valve shown in Fig. 4.

With reference primarily to Fig. 1 of the drawing, the cleansing and filtering device of the present invention is shown as indicated generally at 10. As shown, the device is adapted for use in connection with an aquarium, indicated generally at 11. In the usual manner, aquariums of the type illustrated are generally provided with sand or the like 12, in order that the aquarium may be attractive and may simulate the normal habitat of ornamental fish and other water creatures.

As shown, the cleansing and filtering device includes generally a pumping member 13, the lower end of which is secured to an elongated rigid suction tube 14. The tube 14 is adapted to be manually placed in the water in the aquarium and to extend to a position adjacent the bottom of the aquarium. The suction tube 14 is also preferably made from a transparent material, such as a transparent plastic or the like, in order that the passage of sand and contaminants may be easily noted. The upper end of the pumping member 13 is adapted to be secured to a flexible tube 15, this flexible tube having a porous filter bag 16, removably secured to the free end thereof. As shown in Fig. 1, the device of the present inveniton is adapted to be supported manually with one hand about the pumping member 13 and the other hand holding the free end of the flexible tube 15 adjacent the attachment point for the filter bag 16, this filter bag being disposed either directly above or in the water contained in the aquarium 11. As shown at 17, the cleansed water is adapted to drain from the filter bag 16 and be returned to the aquarium 11.

With reference now primarily to Fig. 3 of the drawing, the pumping member 13 comprises a bulbous portion 18 in which a cavity or chamber 19 is formed. An inner wall 20 of the bulbous member 18 is provided with a plurality of annular ribs 21 in order that the bulbous member 18 may not be collapsed completely. The lower end of the bulbous member 18 is provided with a tubular extension 22 in which an upper end 23 of the suction tube 14 is adapted to be disposed. A resilient spring member 24 is positioned about the extension 22 thereby to exert radially inwardly directed pressure to maintain the suction tube 14 in position therein and provide a water tight seal between the suction tube and the pumping member.

The upper end of the bulbous member 18 is further provided with a tubular extension 25 in which the flexible tube 15 is adapted to be disposed. The flexible tube 15 may be secured in position relative to the extension 25 as by a suitable adhesive 26 or the like. As shown primarily in Fig. 2, the flexible tube 15 is adapted to extend to the filter bag 16. The free end 27 of the filter tube 15 is adapted to receive a rigid insert 28, thereby to expand this free end and provide an enlargement thereon. The upper end of the filter bag 16 is normally gathered as at 29 and secured to the flexible tube 15 as by a suitable tie of cord or the like indicated at 30. Thus, as water flows from the flexible tube 15 into the interior of the filter bag 16, any contaminants contained therein will be retained by the filter bag 16 and by removing the filter bag by means of the tie 30, these contaminants may be easily removed from the bag. The enlargement on the free end of the tube 15 formed by the insert 28, prevents the filter bag 16 from inadvertently being removed from the flexible tube.

In order to provide the necessary pumping action of the pumping member 13, a pair of check valves indicated generally at 31 and 32 are provided. The check valves 31 and 32 are substantially identical, one of the valves 31 being illustrated in Figs. 4 and 5. As shown, the check valve 31 includes a disc portion 33 which has a centrally disposed aperture 34 formed therethrough. A relatively thin flexible valve member 35 is adapted to be positioned on one side of the disc 33 and to overlie the aperture 34, the periphery of the valve member 35 extending radially outwardly beyond the aperture 34 and being spaced radially inwardly from the periphery of the disc 33. An opening 36 is provided through the flexible valve member 35 adjacent the periphery thereof and radially spaced outwardly from the aperture 34. In order to provide a hinge for the flexible valve member 35, a bonding material 37 is placed over the periphery of the flexible valve member 35 on at least one side thereof, this bonding material extending through the opening 36 through the flexible valve member 35 and being bonded to the disc 33 both through the opening 36 and radially outwardly from the periphery of the flexible valve member. A portion 38 of the flexible valve member is thus confined beneath the bonding material 37 to provide a hinge line 39 for the flexible valve member.

With reference now again to Fig. 3 of the drawing, the check valve member 31 is adapted to be retained in the upper end 23 of the suction tube 14 with the disc 33 secured to the inner wall of the suction tube as by an adhesive 40 or the like. The check valve 31 is arranged in position in such a manner as to permit water flow only in a direction from the suction tube 14 to the interior of the bulbous member 18.

To provide a support for the second check valve 32, the upper end of the bulbous member 18 is reduced in diameter as at 41 and provided with an inwardly directed annular groove 42. The disc 33 of the check valve 32 is adapted to be disposed in the annular groove 42, thus to position the check valve 32 intermediate the interior of the bulbous member 18 and the flexible tube 15. The placement of the check valve 32 is such as to permit water flow only in a direction from the interior of the bulbous member 18 to the flexible tube 15.

It may thus be seen that by systematic and repeated manual collapsing of the bulbous portion 18 of the pumping member 13, that water together with sand and contaminants will be drawn upwardly through the suction tube 14, into the interior of the bulbous portion 18 and out through the flexible tube 15 and into the filter bag 16 to therein be filtered and returned to the aquarium. Sand and other heavy particles that may be contained in the bottom of the aquarium are normally drawn into the suction tube 14 and extend normally part of the way into this suction tube to there be tumbled and rolled by the passage of water thereover, thereby cleaning these particles. The suction tube 14 may be moved from place to place along the bottom of the aquarium in order that various portions of the sand and contaminants contained therein will be drawn into the tube for cleansing.

Having thus described the invention and the present embodiment thereof, it is desired to emphasize the fact that many modifications may be resorted to in a manner limited only by a just interpretation of the following claims.

I claim:

1. An aquarium cleaning device, comprising a bulb of rubber-like material for pumping water from an aquarium, said bulb having an opening at its intake end for access to the interior of the bulb and having an inner circumferential groove near its discharge end accessible through said opening; a discharge valve removably seated in said groove and dimensioned to pass through said opening; an intake tube removably telescoped at one end into said opening, and an intake valve mounted on the telescoped end of said intake tube for access by withdrawal of the intake tube from said opening.

2. An aquarium cleaning device, comprising a bulb of rubber-like material for pumping water from an aquarium, said bulb having an opening at its intake end for access to the interior of the bulb and having an inner circumferential groove near its discharge end accessible through said opening; a discharge valve removably seated in said groove and dimensioned to pass through said opening; a rigid intake tube removably telescoped at one end into said opening; a resilient member compressively encircling said bulb in the region of said opening to tighten the bulb around the rigid intake tube; and an intake valve mounted on the telescoped end of said intake tube for access by withdrawal of the intake tube from said opening.

3. An aquarium cleaning device, comprising a bulb of rubber-like material having an opening at each end thereof, one of said openings being substantially larger than the other, said bulb having an inner circumferential groove adjacent the smaller of said openings and accessible through said larger opening; a discharge valve dimensioned to pass through said larger opening removably seated in said groove to control flow of water through said smaller opening; a discharge tube having one end thereof mounted in said smaller opening; an intake tube having one end thereof removably telescoped into said larger opening; and an intake valve mounted on said one end of the intake tube nad accessible by withdrawal of said intake tube from said larger opening.

References Cited in the file of this patent

UNITED STATES PATENTS

| | | |
|---|---|---|
| 32,815 | Arnold | July 16, 1861 |
| 157,593 | Elmenhorst | Dec. 8, 1874 |
| 224,370 | Wilson | Feb. 10, 1880 |
| 240,922 | Niese | May 3, 1881 |
| 247,142 | Woods | Sept. 13, 1881 |
| 249,557 | Truesdell | Nov. 15, 1881 |
| 834,185 | Campbell | Oct. 23, 1906 |
| 1,117,779 | Bulmer | Nov. 17, 1914 |
| 1,163,716 | Van Der Putten | Dec. 14, 1915 |
| 1,495,902 | Goyer et al. | May 27, 1924 |
| 1,637,219 | Edelmann | July 26, 1927 |
| 1,788,709 | De Spain | Jan. 13, 1931 |
| 1,941,859 | Hall | Jan. 2, 1934 |
| 2,418,247 | Dalzell | Apr. 1, 1947 |
| 2,558,471 | Whitlock | June 26, 1951 |
| 2,636,308 | Demmer | Apr. 28, 1953 |
| 2,672,987 | Hutchinson | Mar. 23, 1954 |

FOREIGN PATENTS

| | | |
|---|---|---|
| 535,136 | France | Jan. 19, 1922 |